United States Patent Office 3,663,543
Patented May 16, 1972

3,663,543
2,3-DICHLORO-5,10-DIHYDROPYRAZINO(2,3-b) QUINOXALINE
Aylin H. Gulbenk, Walnut Creek, Dorothy J. Horne, Piedmont, and Howard Johnston, Walnut Creek, Calif., assignors to The Dow Chemical Company, Midland, Mich.
No Drawing. Filed Feb. 2, 1970, Ser. No. 9,260
Int. Cl. C07d 51/76, 51/78
U.S. Cl. 260—250 R            2 Claims

ABSTRACT OF THE DISCLOSURE

Halogenated, tricyclic pyrazino compounds having the general structure:

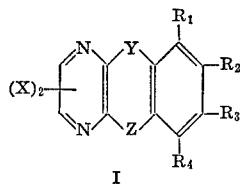

wherein the X's independently, in each occurrence, represent hydrogen or halogen, Y and Z independently are

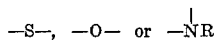

(where R is hydrogen or alkyl), and $R_1$, $R_2$, $R_3$ and $R_4$ are independently hydrogen, alkyl or halogen. Said compounds are prepared by reacting the appropriate polyhalopyrazine compound with a benzene compound which is ortho-substituted by two groups selected from hydroxy, mercapto and/or amino radicals. The compounds are variously useful as pesticides for the control of plant, insect and other organisms.

SUMMARY OF THE INVENTION

This invention relates to novel tricyclic pyrazino compounds and to a method for preparing the same, said compounds having the formula:

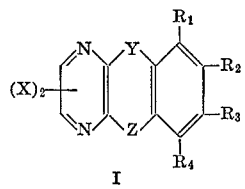

wherein the X's independently, in each occurrence, represent hydrogen or halogen, Y and Z independently are

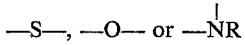

(where R is hydrogen or alkyl), and $R_1$, $R_2$, $R_3$ and $R_4$ are independently hydrogen, alkyl or halogen. Said compounds are prepared by reacting the appropriate polyhalopyrazine compound with a benzene compound which is ortho-substituted by two hydroxy, mercapto and/or amino radicals. As employed herein and in the claims, the term "halogen" designates chlorine, bromine or fluorine and "alkyl" designates an alkyl group containing 1, 2, 3, etc. and up and including 7 carbon atoms, and from 1 to 2, to 3, etc. and up to and including 7 carbon atoms such as methyl, ethyl, propyl, isopropyl, butyl, isobutyl, pentyl, hexyl, sec.-hexyl and heptyl. For convenience of description, the compounds coming within the scope of the above formula, as defined herein, are referred to below and in the claims as "tricyclic pyrazino" compounds or more simply as pyrazino" compounds.

The novel compounds of this invention are solid compounds varying in color from off-white to yellow, brown and green. They are substantially insoluble in water and have from limited to good solubility in organic solvents such as acetone, benzene, hexane, dichloromethane, carbon tetrachloride, ethanol and isopropanol. Said novel compounds have utility in a wide variety of pesticidal applications and are variously active in insecticides, herbicides, fungicides, bactericides, helminthicides, and piscicides, among other applications.

Representative novel compounds coming within the scope of the present invention include the following:

2,3-dichloro-p-benzodioxino(2,3-b)pyrazine
2,3-dibromo-p-benzodioxino(2,3-b)pyrazine
2,3-dichloro-5,10-dihydropyrazino(2,3-b)quinoxaline
2,3-difluoro-5,10-dihydropyrazino(2,3-b)quinoxaline
2,3-dichloro-10H-pyrazino(2,3-b)benzothiazine
2,3-dichloro-10H-pyrazino(2,3-b)benzoxazine
2,3-dibromo-10H-pyrazino(2,3-b)benzoxazine
2,3-difluoro-10H-pyrazino(2,3-b)benzoxazine
2,3-dichloro-8-methyl-10H-pyrazino(2,3-b)benzoxazine
2,3-dichloro-7-methyl-(1,4)benzodithiino(2,3-b)-
  pyrazine
2,3-dichloro-10-n-propylpyrazino(2,3-b)-
  benzothiazine
2,3-dichloro-10-n-hexylpyrazino(2,3-b)-
  benzothiazine
7-methyl-(1,4)benzodithiino(2,3-b)pyrazine
7-n-propyl-(1,4)benzodithiino(2,3-b)pyrazine
2,3,6,7,8,9-hexachloro-(1,4)benzodithiino)(2,3-b)-
  pyrazine
6,7,8,9-tetrachloro-(1,4)benzodithiino(2,3-b)-
  pyrazine
6,7,8,9-tetrabromo-(1,4)benzodithiino(2,3-b)-
  pyrazine
6,7,8,9-tetrafluoro-(1,4)benzodithiino(2,3-b)-
  pyrazine
2,3-dichloro-p-benzothioxino(2,3-b)pyrazine
2,3-dibromo-6,7,8,9-tetrachloro-(1,4)benzodithiino-
  (2,3-b)pyrazine.

In its process aspects, the present invention is directed to a method of preparation whereby a 2,3-dihalo or a 2,3,5,6-tetrahalopyrazine is reacted, in a basic reaction medium, with a benzene derivative compound which is substituted in ortho positions on the benzene ring by two radicals selected from the group consisting of hydroxy, mercapto and amino radicals. The benzene ring may also carry other substituted groups such as alkyl, halo, nitro or the like which do not interfere with the present reaction. Representative benzeno reactants which can be employed in the present process include:

o-phenylenediamine,
o-aminophenol,
o-mercaptophenol,
o-aminobenzenethiol,
pyrocatechol,
3,4-toluenedithiol,
tetrachloro-o-benzenedithiol,
1,2-dimercaptobenzene,
1,2-dihydroxy-4,5-dimethylbenzene,
1,2-dihydroxy-4-isopropylbenzene,
1,2-dihydroxy-3-methylbenzene,
1,2-dihydroxy-3,4,5,6-tetrabromobenzene,
tetrachloro-o-benzenediol,
1,2-dihydroxy-3,4,5-trichlorobenzene,
1,2-dihydroxy-4-propylbenzene,
1,2-diamino-3,5-dichlorobenzene,
1,2-diamino-4-methylbenzene,
1,2-diamino-4-nitrobenzene,
2-amino-4-methylphenol, and
tetrabromo-o-benzenedithiol.

It is also possible to use the hydroxy-substituted benzene reactants in the form of the corresponding sodium or other alkali metal alcoholates.

Representative polyhalopyrazine reactants include 2,3-dichloropyrazine, 2,3-dibromopyrazine, tetrachloro- pyrazine, tetrabromopyrazine, and mixed chlorobromopyrazines such, for example, as 2,3-dichloro-5,6-dibromopyrazine and 2,6-dichloro-3,5-dibromopyrazine.

The respective benzeno and pyrazino reactants combine with one another in equimolar proportions and while either reactant can be employed in excess, this does not necessarily promote the desired 2-step reaction. Accordingly, the reactants are preferably employed in substantially equimolar amounts.

The reaction takes place in an alkaline reaction medium which serves to take up the two moles of hydrogen halide (HCl or HBr) which are normally formed during the reaction. This alkalinity is preferably supplied by adding sodium or potassium hydroxide to the solution or, in appropriate instances, by introducing the alkali ion into the benzene reactant in the form of an alkali metal phenolate. The latter method is feasible when dealing with benzene reactants which contain one or two hydroxy groups as disclosed below in Example 1. It is also possible to supply the requisite alkalinity by conducting the reaction in a basic solvent medium such, for example, as dimethylformamide. In a typical reaction wherein tetrachloropyrazine reacts with pyrocatechol to form the tricyclic pyrazino product together with two moles of HCl as a byproduct, the requisite two moles of caustic (e.g. sodium hydroxide) can be added to the reaction solution. Alternatively, one or both of the —OH groups in the pyrocatechol reactant can be replaced by —ONa, in which event NaCl is also a byproduct, and the amount of NaOH employed can be correspondingly reduced or even eliminated.

The present reaction takes place as the reagents, including any necessary alkaline material, are heated in contact with one another in the presence of a liquid solvent medium which does not interfere with the reaction at the reaction conditions employed. Representative solvents of this character include ethanol, isopropanol, cyclohexane, benzene, dimethoxyethane, acetonitrile, dimethylsulfoxide and dimethylforamide. The latter reagent is alkaline in nature and serves to promote the reaction, especially when employed in lieu of part or all of the alkaline agent which would otherwise be added to take up the hydrogen halide byproduct of the reaction.

Reaction times and temperatures for the reaction by which the tricyclic pyrazino compound is formed will vary depending on the nature of the reactants. However, in most cases the reaction will proceed to completion when the reaction mixture is refluxed or otherwise heated at temperatures ranging from about 40° to 175° C. for periods of from about ½ to 5 or more hours. Some systems are mildly exothermic during the first portion of the reaction (in which the ring between the pyrazine and benzene reactant becomes partially closed), through heat is thereafter applied to close the center ring and drive the reaction to completion.

Once the reaction, formative of the tricyclic pyrazine structure is completed, said compound can be isolated from the other components of the reaction mixture by conventional procedures such as precipitation in water, washing and extraction. The crystalline products so obtained can be further purified by recrystallization, as well as by chromatographic, distillation or other liquid-liquid or vapor-liquid separatory and recovery procedures. It proves to be particularly convenient, in the present process, to add the reaction mixture to water, either with or without first distilling off a portion of the solvent present, thereby inducing precipitation of the desired tricyclic compound along with any unreacted or partially reacted organic compounds which may be present. The tricyclic compound, if not the only component of the precipitate, can be readily separated from the other, more soluble components by methods of fractional crystallization.

Those of the tricyclic pyrazino compounds which are fluoro-substituted can be prepared from the corresponding chloro-substituted tricyclic pyrazino compounds by reacting the latter with potassium fluoride in the presence of an organic solvent which is inert under the reaction conditions employed, e.g., acetonitrile, dimethylsulfoxide, dimethylformamide, sulfolane and dimethylsulfone. One mole of potassium fluoride is consumed for each fluorine atom which is introduced into the tricyclic pyrazino compound by replacement of a chlorine atom, and while the proportions in which the reactants are employed are not critical, the reaction is preferably conducted using an excess of potassium fluoride over the stoichiometric amount theoretically required to form the expected fluoro-substituted compound. The desired halogen exchange reaction takes place at temperatures ranging from about 40 to 250° C. Ambient pressures can be employed, as may the super atmospheric pressures engendered as the reactants are heated to relatively high temperatures in a sealed pressure vessel. Reaction times vary from about ½ to 20 or more hours. The fluoro-substituted products can then be recovered from the residue of the reaction mixture by a practice of known separation methods, as described above.

Those compounds of the present invention wherein R (as referred to in connection with Y or Z of the above formula) is alkyl can be prepared from the corresponding tricyclic pyrazino compounds wherein Y and/or Z is comprised of the —NH group by reacting said compounds with the appropriate halo compound which is capable of supplying the desired alkyl group to the pyrazino compound. This halo reactant preferably is employed in excess. In carrying out this reaction, the reactants are heated in an inert solvent medium along with a strong hydrogen halide acceptor such, for example, as potassium tertiarybutoxide, and once the reaction is complete the reaction mixture is poured into water to precipitate out the desired pyrazino compound.

EXAMPLE 1

2,3-dichloro-10H-pyrazino(2,3-b)benzoxazine

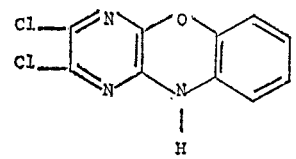

A solution of tetrachloropyrazine (10 g., 0.046 mole) in 200 ml. of isopropanol is prepared and to this solution is addfed 5 g. (0.046 mole) of o-aminophenol in the form of its sodium salt. The resulting mixture is refluxed for 2 hours under a nitrogen atmosphere, following which a portion of the isopropanol is distilled off and the balance of the reaction mixture is poured over ice. The resulting solid product is filtered off and taken up in benzene, with the solid portion which did not go into solution being filtered off and discarded. Analysis showed that this product, on being recrystallized from hexane, was the intermediate

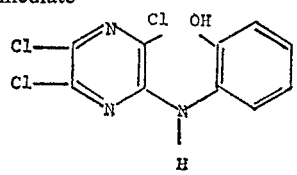

This latter compound, in the amount of 5 g. (0.0172 mole) is then added to 100 ml. of isopropanol, and to this mixture is then added a solution of 0.76 gram (0.019 mole) of sodium hydroxide in 10 ml. of water. This mixture is refluxed for 0.5 hour, then poured over ice. The resulting solid product is filtered off and recrystallized from a mixture of benzene and hexane. Infrared, mass spectrographic and nuclear magnetic resonance analyses indicate the product to be the compound having the structure shown in the caption of this example. This is confirmed by elemental analysis which shows the presence of carbon, hydrogen, chlorine and nitrogen in the amounts of 47.43, 2.40, 27.52 and 16.79 percent, respectively, as against theoretical values for these elements of 47.2, 1.97, 27.8 and 16.5 percent, respectively. The compound is off-white in color, has a melting point of 115–117° C., has good solubility in acetone, benzene and hexane, and is substantially insoluble in water.

EXAMPLE 2

In a manner similar to that described above in Example 1, the following compounds are prepared:

2,3-dibromo-10H-pyrazino(2,3-b)benzoxazine having a molecular weight of 342.0 by the reaction of tetrabromopyrazine with o-aminophenol.

2,3-dichloro-8-methyl - 10H - pyrazino(2,3-b)benzoxazine having a molecular weight of 268.11 by the reaction of tetrachloropyrazine with 2-amino-4-methylphenol.

EXAMPLE 3

2,3-dichloro-10H-pyrazino(2,3-b)benzothiazine

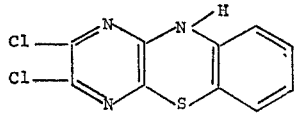

A solution of sodium (2.3 g., 0.1 mole) and 0-aminobenzene (12.5 g., 0.1 mole) in 200 ml. of isopropanol is slowly added to solutions tetrachloropyrazino in 300 ml. of isopropanol. The resulting reaction is moderately exothermic and results in the formation of a heavy precipitate which necessitates the addition of a further amount (250 ml.) of isopropanol in order to effect its dissolution. The solution is then stirred for approximately 2 hours at room temperature and subsequently poured over ice. There results a yellow precipitate which analysis showed to be the intermediate having the structure

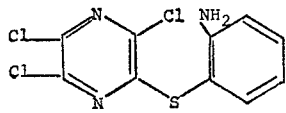

The foregoing product in the amount of 18.3 g. is then taken up to 300 ml. of dimethylformamide, and the resulting solution is refluxed for one hour and then poured over ice. The resulting yellow precipitate is filtered off and dried to give a yellow powder having a melting point of 260° C. which is substantially insoluble in water, of moderate solubility in acetone and of good solubility in benzene. The product is identified by infrared and nuclear magnetic resonance methods of analysis as the captioned compound, and this analysis is confirmed by elemental analysis which shows the product to have carbon, hydrogen, nitrogen, chlorine and sulfur contents of 44.99, 1.22, 15.60, 26.36 and 11.84 percent, respectively, as against theoretical values for said elements of 44.5, 1.85, 15.55, 26.3 and 11.8 percent, respectively.

EXAMPLE 4

2,3-dichloro-p-benzodioxino(2,3-b)pyrazine

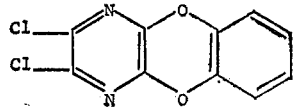

Tetrachloropyrazine (9 g., 0.041 mole) and pyrocatechol (4.6 g., 0.042 mole) are dissolved in 150 ml. of ethanol along with sodium hydroxide (1.68 g., 0.042 mole) in 10 ml. water. The resulting mixture is refluxed for 1 hr. and is then reduced in volume by distilling off approximately one half the solvent. The resulting mixture is cooled and then diluted with water until no further precipitation results. The precipitate is filtered off, recrystallized from benzene, dried and recovered as 4.3 g. of a light tan product having a melting point of 228° C. It is moderate soluble in benzene, acetone and hexane, and is substantially insoluble in water. The product is identified as the subject compound by infrared, nuclear magnetic resonance and mass spectrographic analysis. This is confirmed by elemental analysis which discloses the compound to have carbon, hydrogen, chlorine and nitrogen contents of 47.2, 1.74, 28.2 and 10.72 percent, respectively, as against theoretical values for these elements of 47.1, 1.5, 27.8 and 11.0 percent, respectively.

In the foregoing operation, there is also recovered 3.7 g. of unreacted tetrachloropyrazine, said material being crystallized from the benzene solution after the less soluble tricyclic product has been recovered. This indicates that ring closure takes place rapidly once the initial reaction step has taken place, a behavior which is in contrast to the operations of Examples 1 and 2 above wherein the intermediate, partially closed ring product can readily be recovered as such.

When the foregoing reaction is conducted using 2 moles of sodium hydroxide for each mole of tetrachloropyrazine, and with either dimethylformamide or dimethylsulfoxide being employed as the solvent, the reaction readily goes to completion in excellent yield. In the procedure with dimethylformamide the solution is heated for 1.3 hrs. at 78° C.; with the dimethylsulfoxide solvent, the heating is continued for 1.5 hours at temperatures ranging from 80° to 106° C.

EXAMPLE 5

In a manner similar to that described above in Example 4, the following compounds are prepared:

2,3-dibromo-p-benzodioxino(2,3-b)pyrazine having a molecular weight of 342.97 by the reaction of tetrabromopyrazine with catechol.

2,3-dichloro-p-benzothioxino(2,3-b)pyrazine having a molecular weight of 271.12 by the reaction of tetrachloropyrazine with o-mercaptophenol.

EXAMPLE 6

2,3-dichloro-5,10-dihydropyrazino(2,3-b)quinoxaline

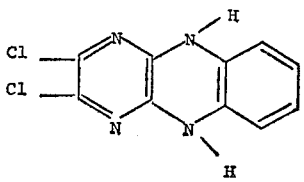

Tetrachloropyrazine (10.9 g., 0.05 mole) and o-phenylenediamine (5.4 g., 0.05 mole) are dissolved in 150 ml. of dimethylformamide, and the solution is heated under reflux conditions for 1 hour. The resulting, dark colored reaction mixture is then poured over ice, thus inducing precipitation of a green precipitate which is filtered off, washed and dried. It is found to have a melting point of 260° C. and is substantially insoluble in water, moderately soluble in acetone, and relatively insoluble in benzene. The product is identified as the captioned compound by infrared and nuclear magnetic resonance methods of analysis. This identification is confirmed by elemental analysis which shows the compound to have carbon, hydrogen, nitrogen and chlorine contents of 46.74, 2.83, 21.50 and 28.80 percent, respectively, as against theoretical values for these elements of 47.5, 2.4, 22.1 and 28.0 percent, respectively.

EXAMPLE 7

2,3-difluoro-5,10-dihydropyrazino(2,3-b)quinoxaline

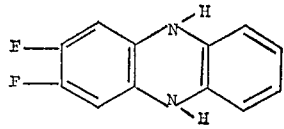

The 2,3 - dichloro-5,10-dihydropyrazino(2,3-b)quinoxaline compound of Example 6 (2.53 g.; 0.01 mole) and potassium fluoride (5.8 g.; 0.1 mole) are reacted at 125° C. for 12 hours inthe presence of 20 ml. of dimethylformamide. The reaction mixture is cooled and filtered to remove salts, and the filtrate is diluted with water. The water-insoluble crude material is taken up in dichloromethane and rewashed with water to remove any remaining dimethylformamide. The washed organic product phase is then dried with sodium sulfate and the solvent distilled off to give the desired 2,3-difluoro-5,10-dihydropyrazino(2,3-b)quinoxaline having a molecular weight of 220.9.

EXAMPLE 8

2,3-dichloro-10-n-propylpyrazino(2,3-b)benzothiazine

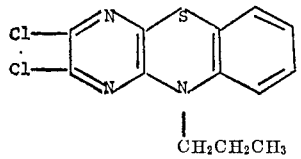

The 2,3-dichloro - 10H - pyrazino(2,3-b)benzothiazine compound of Example 3, in the amount of 2 g. (0.0074 mole) is added to 35 ml. of dimethoxyethane containing 0.9 g. (.008 mole) of potassium tertiarybutoxide, and to the solution is then added 1.36 g. (.008 mole) of propyliodide. The solution is refluxed for 15 minutes, at which time a further amount (5 g.) of the iodide is added, followed by another reflux period of 50 minutes. By this time the color of the solution has changed from a deep red to a tan color. A small amount of the solvent is boiled off and the residue is poured into cold water. Hexane is then added which takes up the oily bottom layer after which the resulting organic layer is decanted off and cooled to crystallize out a brown crystalline product. This product has a melting point of 99–101° C., is substantially insoluble in water, and has good solubility in acetone and benzene. It is identified by infrared and nuclear magnetic methods of analysis as the captioned compound. This is confirmed by elemental analysis which discloses the compound to have carbon, hydrogen, chlorine, nitrogen and sulfur contents of 51.9, 2.21, 22.48, 12.52 and 10.18 percent, respectively, as against theoretical values for these elements of 50.0, 3.5, 22.8, 13.4 and 10.3 percent, respectively.

EXAMPLE 9

2,3-dichloro-7-methyl-benzodithiino(2,3-b)pyrazine

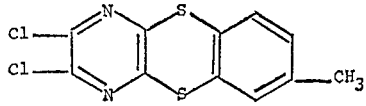

A solution of tetrachloropyrazine (7 g., 00.032 mole) in 55 ml. of ethanol is heated to 60° C., and to this solution is slowly added a solution of 3,4-toluenedithiol (5 g., 0.032 mole) in aqueous caustic (2.56 g., 0.064 mole, of NaOH in 15 ml. $H_2O$). The resulting reaction mixture is then refluxed for 1.5 hours, after which it is cooled and poured over ice. The precipitate which then forms is filtered off and taken up in hexane containing 10 percent benzene. This solution is cooled, thus precipitating out 2 g. of a yellow crystalline product, M.P. 133–136° C., which has good solubility in hexane and benzene, moderate solubility in acetone, and little if any solubility in water. The product is identified as the captioned tricyclic compound by infrared, nuclear magnetic resonance and mass spectra methods of analysis. This is confirmed by elemental analysis which shows the compound to have carbon, hydrogen, chlorine, nitrogen and sulfur contents of 44.5, 2.4, 22.98, 9.0 and 21.4 percent, respectively, as compared with theoretical values for these elements of 44.0, 2.0, 23.6, 9.3 and 21.3 percent, respectively.

EXAMPLE 10

7-methyl-(1,4)benzodithiino(2,3-b)pyrazine

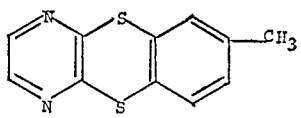

To a stirred solution of 1.47 g. of sodium in 300 ml. of absolute alcohol is added 5.0 g. of 3,4-toluenedithiol. This solution is stirred for 10 minutes, following which there is added 4.77 g. of 2,3-dichloropyrazine in 50 ml. of absolute methanol. The resulting reaction mixture is heated at reflux for 6 hours, then evaporated in vacuuo. The residue is taken up in benzene and separated into its component fractions by column chromatography on alumina. A 5 percent ether-hexane wash elutes 3.7 g. of a buff-colored solid having a melting point of 110–111° C. which has good solubility in acetone, benzene and hexane and is substantially insoluble in water. This product is identified as the captioned compound by infrared, nuclear magnetic resonance and mass spectrographic methods of analysis. This identification is confirmed by elemental analysis which discloses the compound to have carbon, hydrogen and nitrogen contents of 56.5, 3.7 and 12.5 percent, respectively, as against theoretical values for these elements of 57.0, 3.5 and 12.1 percent, respectively.

EXAMPLE 11

6,7,8,9-tetrachloro-(1,4)benzodithiino(2,3-b)pyrazine

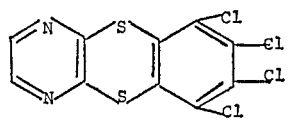

To a solution of 0.92 g. of sodium in absolute methanol is added 5.6 g. of tetrachloro-o-benzenedithiol. The mixture is stirred for 10 minutes and then evaporated in vacuuo. The residue is taken up in dimethylformamide and treated with 2.92 g. of 2,3-dichloropyrazine. This reaction mixture is heated at 60–70° C. with stirring for 6 hours, then cooled and poured into water. The resulting precipitate is washed and dried and then separated into its component fractions by column chromatography with silica gel. Using chloroform there is recovered as the second cut from the column a fluffy yellow solid having a melting point of 253–255° C. and which is insoluble in water and of good solubility in acetone and benzene. This is identified as the captioned compound by infrared analysis and by elemental analysis which shows the compound to have carbon, hydrogen and nitrogen contents of 33.22, 0.81 and 7.98 percent, respectively, as against theoretical values of 33.72, 0.57 and 7.88 percent, respectively, for these elements.

EXAMPLE 12

In a manner similar to that described above in Example 11, the following compounds are prepared:

6,7,8,9-tetrabromo-(1,4)benzodithiino(2,3-b) pyrazine having a molecular weight of 531.90 by the reaction of 2,3-dichloropyrazine with tetrabromo-o-benzenedithiol.

2,3 - dibromo - 6,7,8,9 - tetrachloro(1,4)benzodithiino (2,3b)pyrazine having a molecular weight of 512.88 by the reaction of tetrabromopyrazine with tetrachloro-o-benzenedithiol.

EXAMPLE 13

2,3,6,7,8,9-hexachloro-(1,4)benzodithiino(2,3-b) pyrazine

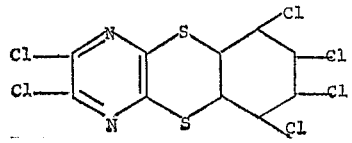

A solution of 0.01 mole of tetrachloropyrazine in 100 ml. of absolute methanol is slowly added to a mixture of 0.1 mole of sodium methoxide in 100 ml. of absolute methanol. To this solution is added 0.01 mole of 3,4,5,6-tetrachloro-o-benzenedithiol, and the mixture is then refluxed for 10 hours. The resulting reaction product is cooled, and the precipitate which had formed in the mixture is filtered off, water-washed and dried. This material, which is identified by infrared and mass spectrographic analysis as the captioned compound, is a yellow solid having a melting point of 278–280° C. It is insoluble in water and of moderate solubility in acetone, benzene and chloroform. Elemental analysis discloses it to have carbon, hydrogen and nitrogen contents of 28.66, 0.6 and 5.7 percent, respectively, as against theoretical values for the subject compound of 28.26, 0.0 and 6.59 percent, respectively.

The tricyclic pyrazine compounds of the present invention are useful as pesticides and have particular utility as fungicides, bactericides, piscicides and insecticides, as selective herbicidal agents for the control of various undesirable weed pests and as anthelmintics in the control of intestinal parasites. In such applications the pest to be controlled is contacted with a pesticidal amount of one or more of the compounds of the invention. For the control of bacterial, fungal, aquatic and insecticidal pests, the organism is contacted with a pesticidal amount which is also an antimicrobial, piscicidal or insecticidal amount of the compound. For control of weed pests, a pesticidal amount which is also an herbicidal amount is employed.

For all such uses the present pyrazino compounds can be employed in an unmodified form or they can be dispersed on a finely divided solid and employed as dust or dispersed in water with or without the aid of a surface active agent and the resulting aqueous suspensions employed as drenches or sprays. In other procedures, the products are employed as active constituents in solvent solutions, in oil-in-water or water-in-oil emulsions, or in aqueous dispersions. All such ingredients and adjuvants cooperate with the active component so as to facilitate the invention and obtain an improved and outstanding result.

The foregoing augmented compositions are adapted to be formulated as liquid or solid concentrates and subsequently diluted with additional liquid or solid adjuvants to produce the ultimate treating composition. Suitable emulsifiable liquid concentrates are formulations of the active pyrazino compound in a suitable organic solvent therefor such as alcohols, alkyl ethers of glycols and polyglycols, ketones, aromatics and petroleum distillates, together with an ionic or non-ionic emulsifying agent or a mixture thereof. Such emulsions are preferably designated such that they are self-dispersing with good stability characteristics. The dusts and dust concentrates can be prepared by dispersing the active toxicant compounds in and on a finely divided inert solid support such as diatomaceous earth, bentonite, fuller's earth, attapulgite and similar clays. For the preparation of wettable powders, the solid carrier may be mechanically ground in admixture with the active component hereof and a surface active dispersing agent.

Any of the foregoing compositions can be distributed so as to contact pests with a pesticidal amount of one or more of the active compounds. This amount depends largely upon the manner of distribution, the type of pest being treated and its extent or severity of development and the degree of control desired or required for any particular purpose. Generally, the effective or pesticidal dosage ranges from 1 to 10,000 or more parts of toxicant per million parts of applied composition. For the control of various weed and other plant pests by the method of topical application, the effective herbicidal dosage ranges from about 10 to 5000 parts of the pyrazino compound per million parts of the composition applied to the plant. For the control of higher plants in soil, the active tricyclic pyrazino compounds hereof ordinarily are distributed in soil in amounts of from about 0.1 to 50 lbs. or more per acre so as to contact seeds and emerging seedlings of the vegetation to be controlled. For the control of bacteria and of lower plants such as fungal organisms, the active compounds usually are applied to growth media of said organisms in amounts to provide from about 10 or less to about 5000 or more parts by weight of the active substituted pyrazino compound per million parts of the ultimate treating composition. For the control of intestinal parasites, the dosage is from about 0.005 to 0.5 percent by weight of the pyrazino compound in the diet of the host animal.

The exact concentration of the active component to be employed in the treating compositions is not critical and may vary considerably provided the required dosage of the effective agent is applied to the growth medium or upon the plant foliage or other body being treated.

In representative operations, 2,3-dichloro-10H-pyrazino (2,3-b)benzoxazine is dispersed in warm melted nutrient agar which is then poured into petri dishes allowed to solidify, the aforesaid compound being employed in a number of different amounts to provide from 1 to 500 parts by weight thereof per million parts (p.p.m.) of the ultimate agar composition. The surface of the agar is then inoculated with a variety of bacterial and fungal pest organisms, and the inoculated plates are incubated under conditions conducive to bacterial and fungal growth. Similar check plates in which the agar contains no active pyrazino or other toxicant compound are similarly inoculated and incubated. In such operations, 100 percent control is obtained of the organisms *Trichophton mentagrophytes* and *Pullularia pullulans* at a level of 10 p.p.m.; of *Staphylococcus aureus, Bacillus subtilis, Aspergillus terreus* and *Salmonella tpyhosa* at a level of 1000 p.p.m.; and of *Canadida albicans* at a level of 500 p.p.m.

In similar tests wherein the chemical 2,3-dichloro-5,10-dihydropyrazino(2,3-b)quinoxaline is admixed in agar solutions, complete control is obtained of the organism *Staphylococcus aureus* at a level of 500 p.p.m.; the chemical 2,3-dichloro-10-propyl-pyrazino(2,3 - b)benzothiazine gives similar control of said organism, as well as of the ringworm fungus *Trichophthon mentagrophytes* at a level of 500 p.p.m. The compound 7-methyl-(1,4)benzodithiino (2,3-b)benzothiazine, at a level of 500 p.p.m. gives complete control of the organisms *Trichopton mentogrophytes, Mycobacterium phlei* and *Cephaloascius fragans.*

In representative operations the chemical 2,3-dichloro-10H-pyrazino(2,3-b)benzoxazine in an aqueous emulsified composition containing about 100 parts by weight of the active compound per million parts of the aqueous composition, when applied as a soil drench at a dosage rate of 10 lbs. of active chemical per acre, provides 100 percent control of fertile soil planted with pig weed or bindweed. Similarly, this chemical gives 75 percent control of the American cockroach at a concentration of 500 parts per million parts of the aqueous treating medium, and 90 percent control of the lettuce downy mildew fungus when applied thereto as an aqueous dispersion containing 100 parts per million of active chemical.

The utility of the compounds as anthelmintics may be seen from the fact that 90 percent control of dog hookworm is obtained by incorporating 2,3-dichloro-10H-pyrazino(2,3-b)benzothiazine or 2,3-dichloro-5,10 - dihydropyrazino(2,3-b)quinoxaline in the diet of mice host animals at a level of 0.06 percent by weight, the latter compound also giving 100 percent control, at this diet level, of the organism mouse trichostrongylid. Said latter compound also functions to control aquatic pests, it giving 100 percent control of goldfish at a level of 22 p.p.m. in water. It also serves an effective fungicide, and gives 80 percent control of potato late blight when applied to foliage at a level of 150 p.p.m.

Each of the compounds 2,3,6,7,8,9-hexachloro(1,4)benzodithiino(2,3-b)pyrazine and 6,7,8,9-tetrachloro(1,4)benzodithiino(2,3-b)pyrazine, when applied as an aqueous emulsion foliar spray containing 400 p.p.m. of active chemical, gives good control of the rice blast disease.

Complete control of the aquatic pest daphnia at a level of 2 p.p.m. is afforded by 2,3-dichloro-10-propylpyrazino(2,3-b)benzothiazine. This chemical also gives 100 percent control of the two spotted spider mite at a dosage level of 500 p.p.m.

In other typical operation, 2,3-dichloro-p-benzodioxino(2,3-)pyrazine gives 80 percent control of the American cockroach and of the southern armyworm when applied to said pests at a concentration of 500 p.p.m.

When applied at a dosage level of from about 100 to 5000 parts per million, each of the compounds of the present invention, the utility of which is not specifically recited above, has the ability to kill, inhibit or otherwise control one or more of the aforesaid or other fungal, bacterial, parasital or weed pests.

The polyhalopyrazine and ortho-substituted benzene starting materials employed in forming the compounds hereof can be prepared by methods known to the skilled in the art. For example, 2,3-dichloropyrazine forms the subject of U.S. Pat. No. 3,291,802, while tetrachloropyrazine is described in U.S. Pat. No. 2,442,473. Tetrabromopyrazine can be prepared by reacting the corresponding tetrachloro compound with HBr at 75–200° C. in an inert solvent. 2,3-dibromopyrazine is described in U.S. Pat. Nos. 2,524,431 and 2,573,268. The compound o-phenylenediamine is made by reducing o-nitroaniline with zinc and sodium hydroxide, while o-aminophenol is made by the reduction of o-nitrophenol. The compound o-aminobenzenethiol is described in Beilstein, 13, 397, while 2-mercaptophenol is described in Beilstein, 6, 793. Pyrocatechol can be prepared by treating salicylaldehyde with hydrogen peroxide. Toluene-3,4-thiol can be prepared from toluene-3,4-disulfonyl chloride with tin and HCl. Tetrachloro-o-benzenedithiol is described in U.S. Pat. 2,842,578. The corresponding tetrabromo compound can be prepared by this same method.

We claim:
1. 2,3-dichloro-5,10-dihydropyrazino(2,3-b)quinoxaline.
2. The method of preparing 2,3-dichloro-5,10-dihydropyrazino(2,3-b)quinoxaline comprising reacting tetrachloropyrazine with o-phenylenediamine at temperatures of from about 40° to about 175° in an alkaline reaction medium.

References Cited
UNITED STATES PATENTS

| | | | |
|---|---|---|---|
| 3,211,694 | 10/1965 | Altermatt | 260—250 R |
| 3,472,849 | 10/1969 | Palamidessi et al. | 260—250 R |

NICHOLAS S. RIZZO, Primary Examiner

U.S. Cl. X.R.

71—88, 90, 92; 260—243 B, 244 R; 424—250